July 18, 1939.  G. P. SCHMITT  2,166,266
LIGHTER
Filed Nov. 27, 1935

INVENTOR.
George Philip Schmitt.
BY
ATTORNEY.

Patented July 18, 1939

2,166,266

UNITED STATES PATENT OFFICE 2,166,266

LIGHTER

George Philip Schmitt, New York, N. Y., assignor to Platinum Products Corp., New York, N. Y., a corporation of New Jersey Application November 27, 1935, Serial No. 51,796

3 Claims. (Cl. 67—7)

This invention relates generally to lighters for use in igniting cigarettes and the like and employing a catalyst which becomes incandescent in co-action with a vaporizable fluid, in the presence of air, such class of lighters being described in United States Patent Number 1,937,097, dated November 28, 1933, reference to which is herein made.

My present improvement comprises catalyst means and method of producing passages in a catalyst, such as one consisting of a platinum black pellet or block, said passages for permitting the mixed vaporizable fluid and air to readily reach the catalyst for incandescence thereof.

Heretofore platinum black has been used for the catalyst, in the form of a pellet or block having a plurality of perforations or in granular form in order that the vaporizable fluid and air mix may pass to the interior of the catalyst to incandesce the same. The catalyst in such forms requires careful handling and particularly that in the form of the perforated pellet or block frequently disintegrates before the same is placed in its holder. I have found that if the pellet or block is first placed in its container or holder and then treated to provide cracks or fissures, the said cracks or fissures allow the mix of vaporizable fluid and air to more readily enter the body structure of the catalyst by virtue of the uneven formation of the walls defining the cracks or fissures. The cracks or fissures also provide a greater number of passages through which the vaporizable fluid and air mix may pass than in a pellet or block with pre-formed apertures, thereby causing the catalyst to incandesce more rapidly.

It is, therefore, an object of this invention to provide a lighter with a catalyst in the form of a pellet or block having cracks or fissures in its body through which the vaporized fluid and air mixture may readily pass to incandesce the catalyst.

It is a further object of this invention to provide a method for producing passages in a catalyst pellet or block for the vapors to incandesce the catalyst, which consists in producing cracks or fissures in the pellet or block after the same has been formed.

These and other objects of the invention and the method and means for their attainment will be more apparent from the following detailed description taken in connection with the accompanying drawing, illustrating embodiments by which the invention may be realized, and in which.

Figure 2:
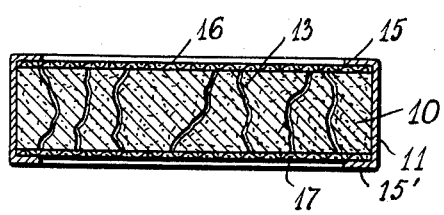
Fig. 2 is a cross-sectional view of Fig. 1.
Figure 3:
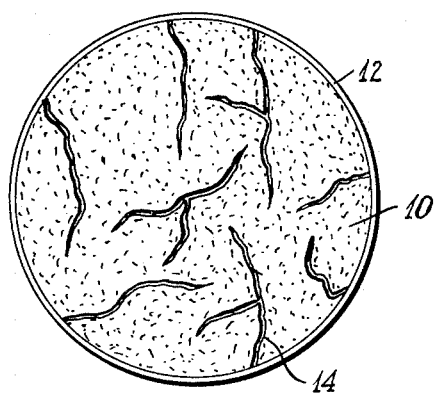
Fig. 3 is an enlarged plan view of a modified form of catalyst employing the invention.

The pellet 10 forming the catalyst element of a lighter is a moulded block usually consisting of platinum composition. Pellet 10 is shown as being encased in an annulus 11 which may be of a flanged type as illustrated in Fig. 2 or of a simple ring type 12 illustrated in Fig. 3, or of any other suitable type. Annulus 11 is preferably made to fit into a heat resisting container or holder of a lighter (not shown). The fissures or cracks 13 or 14 may be obtained in various ways, such as for example by tapping the pellet 10 in the center with a suitable tool, which since the pellet is usually brittle, is the quickest way, or by rapid temperature changes. The pellet or block 10, as hereinabove stated, is shown as surrounded by the encasing annulus 11, and a capsule-like enclosure or holder for the pellet is provided by means of front and rear perforated or meshed disks 16, 17, the said disks being made of suitable heat resisting material. The disks 16, 17 are retained by means of the flanges 15, 15' of annulus 11.

An example of a lighter in which the hereinabove described catalyst may be employed is disclosed in U. S. Patent No. 1,937,097, granted November 28, 1933. The vaporizable fluid mixed with air in the lighter co-acts with the catalyst to incandesce the same.

The fissures or cracks 13, 14 permit the mixed vaporizable fluid and air to more rapidly reach the internal structure of the catalyst and thereby to cause more rapid incandescence thereof than in one with mere perforations.

Figure 1:
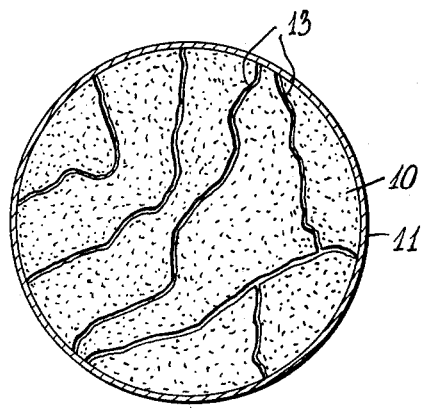
Fig. 1 is an enlarged detailed view of a form of catalyst employed in the invention.

The breaks may be, with or without quite separating into parts, or both. Fig. 1 shows the cracks separating the catalyst material into parts and Fig. 2 without such separation.

While I have here shown what I believe to be simple and efficient forms of the invention it is to be understood that numerous alterations in the details of construction such as may be developed through the exigencies of use may be resorted to without transcending the scope of the invention as defined by the appended claims.

Having described my invention what I claim as new and desire to secure by Letters Patent, is:

1. The method of preparing a catalyst for co-action with a vaporizable fluid to incandesce the same, the catalyst being in the form of a block, which consists in placing the block in a holder and applying pressure to the block to form cracks therein thereby providing passages for the vapors.

2. A catalyst for a lighter comprising a perforated holder, an imperforate mass of catalytic material in the holder having fissures over substantially the entire area thereof and a perforated element over said material.

3. A catalyst for a lighter comprising a relatively solid imperforate block of catalytic material having irregular cracks therein over the major portion of the area thereof providing passages for the vapors.

GEORGE PHILIP SCHMITT.